United States Patent [19]
Appel

[11] 3,887,302
[45] June 3, 1975

[54] TORQUE RESPONSIVE REGULATING APPARATUS FOR A PUMP

[75] Inventor: Wilhelm Appel, Lohr, Main, Germany

[73] Assignee: G. L. Rexroth GmbH, Lohr, Main, Germany

[22] Filed: Aug. 4, 1972

[21] Appl. No.: 277,929

[30] Foreign Application Priority Data
Aug. 6, 1971  Germany.......................... 2139362

[52] U.S. Cl. .................................................. 417/212
[51] Int. Cl. ............................................. F04b 49/00
[58] Field of Search ......... 60/451; 74/751; 417/213, 417/212, 218, 222

[56] References Cited
UNITED STATES PATENTS

| | | | |
|---|---|---|---|
| 1,244,878 | 10/1917 | Manly.................................. | 60/451 |
| 1,259,090 | 3/1918 | Ferris et al............................ | 417/22 |
| 2,778,244 | 1/1957 | Cornwall.............................. | 60/451 |
| 3,153,909 | 10/1964 | Balaban............................... | 60/451 |
| 3,186,170 | 6/1965 | Gauthier.............................. | 60/451 |
| 3,251,247 | 5/1966 | Lamburn .............................. | 74/751 |
| 3,478,513 | 11/1969 | Ma et al................................ | 60/451 |
| 3,512,178 | 5/1970 | Russell................................. | 417/218 |

*Primary Examiner*—William L. Freeh
*Attorney, Agent, or Firm*—Michael S. Striker

[57] ABSTRACT

In order to maintain a constant output of a pump, the regulating means, by which the discharge volume of the pump is adjusted, is operated by a spring biased hydraulic operating motor controlled by a torque responsive spring biassed coupling forming a driving connection between a rotary drive motor and the pump, and including confronting pairs of conical recesses in which balls are located. When the torque between the coupling parts exceeds a predetermined maximum, one coupling part is turned and axially displaced and actuates a control valve to open a discharge conduit connected with the cylinder of the hydraulic operating motor so that the piston thereof is displaced and effects adjustment of the pump to a reduced discharge volume so that the torque is reduced. A pressure responsive valve is also provided for controlling the hydraulic operating motor when the pump pressure exceeds a predetermined maximum.

8 Claims, 1 Drawing Figure

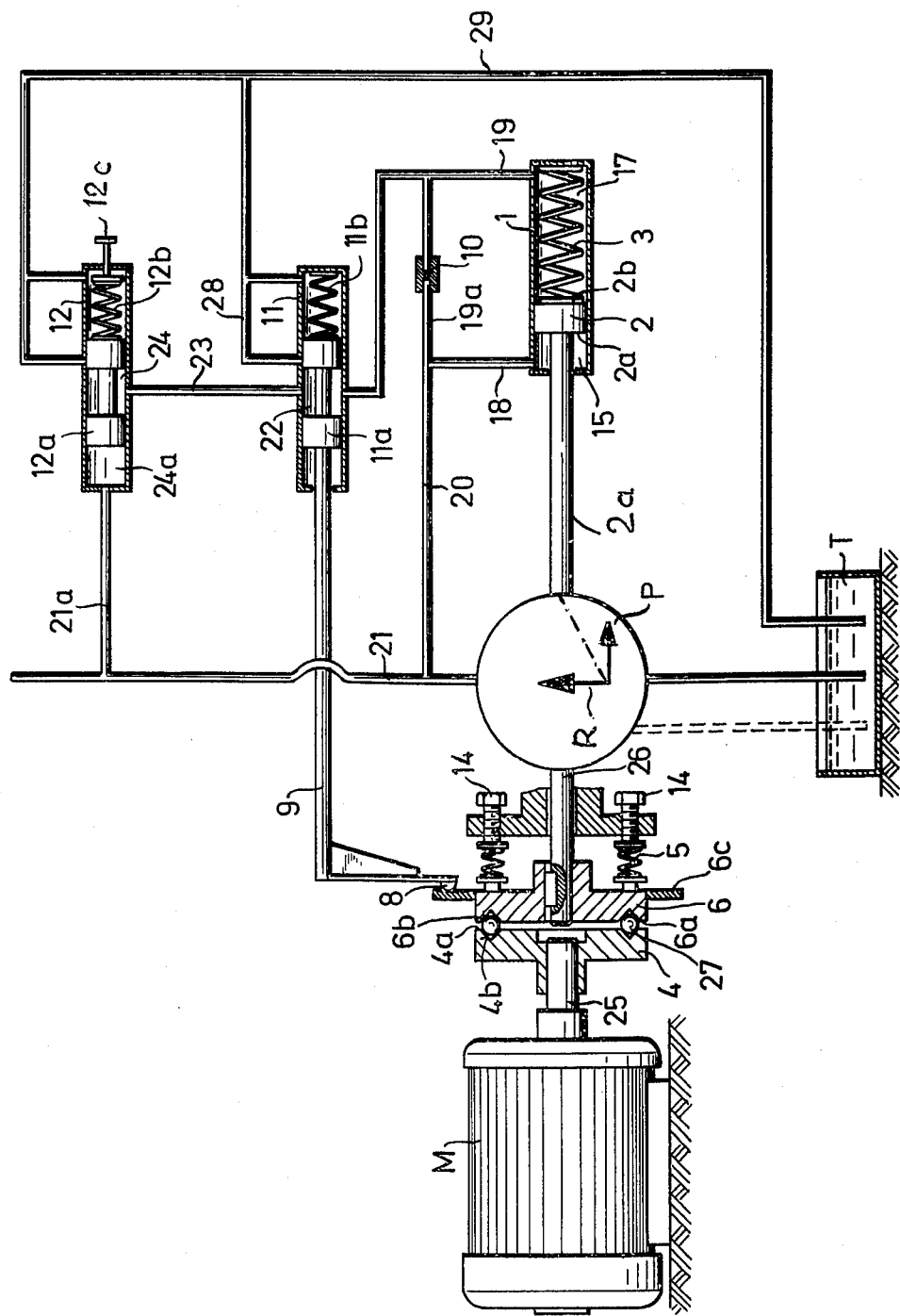

TORQUE RESPONSIVE REGULATING APPARATUS FOR A PUMP

BACKGROUND OF THE INVENTION

The present invention relates to a method and apparatus for regulating the output of a pump which is the product of the discharged volume and the discharge pressure, while the pressure of the pump varies.

It is known to regulate the output power of pumps by means of an operating piston of a hydraulic motor which actuates the regulating means of the pump by which the displaced volume is varied. Since a graphical representation of the output power of hydraulic pumps has a hyperbolic shape, due to the constant product of discharged amount and pressure, the graphical representation of a spring acting on the operating piston for the regulating means, must also have a hyperbolic shape. This hyperbolic shape of the graph representing the spring characteristic, is generally obtained by using several successive engaging springs with differently steep characteristic graphs. The hyperbolic dependency of the adjusting distance of the operating piston in relation to the discharge pressure, is also obtained by the prior art by varying the spring tension by means of a control cam.

It is also known to provide a lever transmission between the operating piston and the regulating means of the pump, which obtains a hyperbolic adjustment.

Power regulating means are also known in which the regulation is effected by an adjustable throttle which is adjusted depending on the angular displacement.

The known arrangements for regulating the power output of a pump, have in common that as a basic factor for the variation of the discharged volume, the pump pressure is used, which results in comparatively expensive constructions. Furthermore, in known power regulating devices, the efficiency of the pump must be considered as a constant factor. Since the efficiency of the pump depends on the operational condition of the pump, substantial deviations of the power transmitted to the pump take place, while the capacity of the drive motor is either not fully used or exceeded.

SUMMARY OF THE INVENTION

It is an object of the invention to provide a method and apparatus for regulating the power output of adjustable hydraulic pumps, which permits a simple construction of the regulating means, and furthermore takes into consideration the efficiency of the pump in any operational condition.

Another object of the invention is to regulate the output of a pump dependent on the torque transmitted from a drive motor to the pump.

With these objects in view, the present invention uses the torque acting on the pump as a factor for regulating the discharged volume of the pump. In accordance with the invention, it is not the pressure which is used for regulation of the power output, but the torque which directly corresponds to the output, and which is advantageously taken directly from the input shaft of the pump. In this simple manner, the efficiency of the pump is considered in determining the power transferred to the pump from the motor.

In a specific development of the invention, an apparatus is provided which comprises regulating means for varying the volume displaced by a pump, operating means for operating the regulating means, preferably a hydraulic cylinder and piston motor, torque responsive means connected with the motor and the pump, and moving to an actuated position when the torque transmitted from the motor to the pump exceeds a predetermined maximum torque, and control means operated by the torque responsive means in the actuated position to actuate the operating means to adjust the regulating means to reduce the volume displaced by the pump. In this manner, the torque transmitted from the drive motor to the pump is reduced for maintaining a constant output power of the pump.

In a preferred embodiment, a coupling is provided between the drive motor and the pump, including first and second coupling parts connected with the shafts for rotation, and one coupling part which is axially movable. When the force and torque transmitted from one coupling part to the other coupling part exceeds a predetermined torque, a relative angular displacement takes place which causes axial displacement of one coupling part which is used for adjusting the regulating means of the pump.

In the preferred embodiment, the two coupling parts have confronting cooperating faces with face portions slanted to the axial directions of the aligned motor and pump shafts, so that one coupling part is axially displaced when relative angular displacement between the coupling parts takes place due to a high torque. Biasing means urge the axially movable coupling part against the other coupling part, and the moving apart of the coupling parts corresponds to the maximum torque determined by the biasing springs, and thereby to the power output of the pump, under consideration of its efficiency. when the axial biasing force is overcome by relative turning movement between the two coupling parts, a preferably mechanical signal is transmitted by sensing means which results in adjustment of the regulating means of the pump and thereby regulation of the amount discharged by the pump. A hyperbolical shape of a graph representing the power output of the pump, is not required.

In a specific embodiment of the invention, the axial displacement of one of the coupling parts is sensed and transmitted to the piston of a hydraulic control valve which opens a discharge conduit for the operating means of the regulator of the pump.

A frictional connection of the two coupling parts with each other is advantageously obtained by providing pairs of registering conical recesses in the confronting faces of the coupling parts, and in each pair, a ball is located which is forced out of the recesses by the slanted surface of the conical recesses upon relative angular displacement between the coupling part caused by a great torque.

It is advantageous to provide a pressure responsive valve which responds to the pressure in the output conduit of the pump to operate the operating means of the pump regulator to regulate the pump accordingly to a smaller discharged volume when the pressure becomes too high.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawing is a schematic view, partially in section, illustrating a torque responsive regulating apparatus according to the invention.

DESCRIPTION OF THE PREFERRED EMBODIMENTS

A rotary motor M has an output shaft 25 aligned with the input shaft 26 of a pump P which is schematically shown to have regulating means R by which the discharged volume of fluid is regulated. The regulating means R are controlled by a piston rod 2a as schematically shown.

The transmission of the drive torque of drive shaft 25 to the shaft 26 of pump P, is effected by a coupling including two coupling parts 4 and 6, respectively secured to shafts 25 and 26 for rotation therewith, but coupling part 6 is mounted on pump input shaft 26 for axial movement.

The confronting faces 4a and 6a have conical recesses 4b and 6b arranged in registering pairs in which balls 27 are located.

The coupling part 6 is pressed by pressure spring 5 against coupling part 6, and the pressure of springs 5 can be adjusted by threaded bolts 14 which act on the ends of the springs 5.

The balls 27 in the pairs of conical recesses 4b and 6b, form a force or friction coupling between the coupling parts 4 and 6. An annular flange 6c is secured to the periphery of coupling part 6, and is engaged by the sensing member 8 secured to the piston rod 9 carrying a double piston 11a located in the cylinder of a control valve 11. A spring 11b urges rod 9 with sensing member 8 against flange 6c of coupling part 6.

The adjustment of the regulating means R of pump P is effected by a hydraulic operating motor 1 whose piston 2 is biassed by spring 3 in the chamber 17. The cylinder chamber 15 and the cylinder chamber 17 are connected by conduits 18, 19, 19a and 20 with the pressure conduit 21 of pump P. The chamber 17 is connected by conduit 19 with the chamber 22 of the control valve 11, and by connecting conduit 23 also with the chamber 24 of a pressure responsive valve 12. The chamber 24a of the pressure responsive valve 12 communicates through a pressure conduit 21a with the outlet conduit 21 of the pump, so that the pressure acting in chamber 24a urges piston means 12a against the action of spring 12b to a position connecting conduit 23 with the discharge conduit 29 which leads to an open discharge container T. The annular chamber 22 in the piston 11a of the control valve 11, is urged by spring 11b to a position in which the sensing means 8 abuts the flange 6c of coupling part 6. When axial displacement of coupling part 6 moves piston rod 9 to the right as viewed in the drawing, the chamber 22 assumes a position connecting the connecting conduit 19, and thereby chamber 17, with the connecting conduit 28 and the discharge conduit 29.

The arrangement operates as follows:

when pump P is at a standstill, so that pump outlet conduit 21 is without pressure, the regulating means R of pump P are set by piston rod 2a due to the pressure of spring 3 to a position for maximum displaced volume.

When motor M is started, pump P first operates to displace a maximum volume through outlet conduit 21. When the pressure of pump P rises to such an extent, that the product of the displaced volume and the increasing pressure requires a torque which is greater than the torque to which the coupling members 4, 6 with balls 27 is adjusted by the adjusting means 14 acting on springs 5, a relative angular movement between the coupling parts 4 and 6 takes place. Due to the slanted faces of the cone-shaped recesses 4b, 6b, the balls 27 abut the conical faces of the respective circumferentially staggered recesses so that coupling part 6 moves to the right as viewed in the drawing along shaft 26. This axial displacement, which depends on the torque transmitted by coupling parts 4 and 6, is transmitted by sensing means 9, 8 to the control piston 11a of the control valve means 11. The displacement of control piston 11a against the action of spring 11b which urges the sensing member 8 against the flange 6c of coupling part 6, effects a connection between chamber 17 and conduit 19 with conduit 28 and discharge conduit 29 by chamber 22 so that the pressure in the operating chamber 17 is reduced. Since the pressure in chamber 15 of the operating motor 1 is maintained, the operating piston 2 is moved against the action of spring 3 to the right as viewed in the drawing, while the regulating means R are adjusted to reduce the discharged volume of the pump toward zero until the torque required by the pump P and produced by the motor M, is reduced to a predetermined torque selected by adjustment of the adjusting screws 14 due to the reduction of the discharged volume, whereby the two coupling parts 4 and 6 return to the initial coupling position. If the pump pressure in pump outlet conduit 21 rises above the value to which spring 12b was adjusted by screw 12c of the pressure responsive valve 12, the piston 12a is displaced against the action of spring 12b due to the pressure in chamber 24 acting on piston 12a, so that connecting conduit 23 is connected with discharge conduit 29, so that chamber 17 of the operating motor 1 is again connected to the discharge container T. When the pressure in cylinder chamber 17 of the operating motor 1 is reduced by this connection, the regulating means R of the pump P are adjusted to use the volume displaced by the pump, independently of the torque transmitted from motor M. When the pump pressure has again dropped below the value set the operation of the adjusting screw 12c of the pressure responsive means 12, the connection between chamber 17 and open container T with the pressure responsive valve 12 is again interrupted, so that in the chamber 17 the pressure rises again due to the flow of pressure fluid through throttle 10 from the outlet conduit 21 to the discharge conduit 19. Higher pressure in chamber 17 results in displacement of piston 2 toward the left as viewed in the drawing, and adjustment of the regulating means R to increase the displaced volume.

Throttle 10 in conduit section 19a assures an efficient relief of the pressure in chamber 17 upon operation of the torque responsive control valve 11, or of the pressure responsive valve 12. It is evident that the balls 27 and recesses 4a and 6a can be replaced by face portions slanted to a plane perpendicular to the common axis of shafts 25 and 26 which slidingly abut each other.

It will be understood that each of the elements described above, or two or more together, may also find a useful application in other types of torque responsive regulating apparatus for a pump differing from the types described above.

While the invention has been illustrated and described as embodied in a torque responsive regulating apparatus for a pump driven by motor, and including torque responsive means measuring the torque transmitted from a drive motor to a pump, and controlling operating means for the regulating means by which the displaced volume of the pump is controlled, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. Torque responsive regulating apparatus comprising a pump having an input means, a high pressure fluid inlet, and a low pressure reservoir; a drive motor having an output means; torque responsive means having a normal position and an actuated position, and moving to said actuated position when the torque transmitted from said motor to said pump exceeds a predetermined torque; regulating operating means for varying the volume displaced by said pump and including a hydraulic operating motor having an operating piston and an operating cylinder; control means operated by said torque responsive means in said actuated position to actuate said regulating operating means to reduce the volume displaced by said pump, said control means including a control valve and a control slide operated by said torque responsive means to control the flow of fluid in said hydraulic operating motor; a hydraulic circuit including conduits for connecting said pressure fluid outlet and said reservoir with said operating cylinder of said hydraulic operating motor and with said valve cylinder of said control valve; and pressure responsive means responsive to the pressure of the pump and connected with said control valve to operate the same to actuate said regulating operating means when the pressure in said pump exceeds a predetermined pressure.

2. Torque responsive regulating apparatus comprising a pump having an input shaft; a drive motor having an output shaft; torque responsive means forming a driving connection between said shafts, said torque responsive means having a normal position and an actuated position and moving to said actuated position when said torque transmitted from said motor to said pump exceeds a predetermined maximum torque, said torque responsive means comprising first and second coupling parts, one of which is connected with said output shaft and the other is connected with said input shaft for rotation and said first coupling part being mounted on the respective shaft for axial movement, biasing means for biasing said first coupling part in axial direction toward said second coupling part, said coupling parts having confronting faces provided with substantially conical recesses axially registering in pairs with each other in said normal position of said coupling parts, and balls located in the registering pairs of recesses, the recesses of each pair being circumferentially displaced in said actuated position to thereby move said first coupling part in axial direction away from said second coupling part, and sensing means responsive to the axial displacement of said first coupling part; regulating operating means for varying the volume displaced by said pump; and control means to actuate said regulating operating means to adjust said pump to reduce the volume displaced by said pump, said sensing means being connected to said control means for actuating the same when said predetermined torque is exceeded.

3. Torque responsive regulating apparatus as claimed in claim 2 wherein said torque responsive means include adjusting means for said biasing means for setting said torque responsive means to said predetermined torque.

4. Torque responsive regulating apparatus comprising a pump having input means; a drive motor having output means; torque responsive means forming a drive connection between said output means and said input means, said torque responsive means having a normal position and an actuated position and moving to said actuated position when said torque transmitted from said motor to said pump exceeds a predetermined maximum torque; regulating operating means for varying the volume displaced by said pump, said regulating operating means including a cylinder, an operating piston forming first and second chambers in said cylinder, and being connected with said pump, a spring located in said first chamber, a pressure conduit means connecting said second chamber with said pump, a discharge conduit means, connected with said first chamber, and a throttle between said pressure conduit means and said discharge conduit means; and control means operated by said torque responsive means in said actuated position to actuate said regulating operating means to adjust said pump to reduce the volume displaced by said pump, said control means including a control cylinder in said discharge conduit means, a control valve slide connected with said torque responsive means for opening and closing said discharge conduit means, and a spring biasing said control valve slide.

5. Torque responsive regulating apparatus as claimed in claim 4 comprising pressure responsive means including a valve cylinder in said discharge conduit means, a valve slide for opening and closing said discharge conduit means, a spring biasing said valve slide, a pressure conduit connecting the outlet of said pump with said valve cylinder so that said valve slide is urged to open said discharge conduit, and a spring in said valve cylinder biasing said valve slide against the pressure of said pump.

6. Torque responsive regulating apparatus comprising a pump having an input means; a drive motor having an output means; torque responsive means forming a driving connection between said output means and said input means, said torque responsive means having a normal condition and an actuated condition, and moving to said actuated condition when the torque transmitted from said motor to said pump exceeds a predetermined maximum torque; regulating operating means for varying the volume displaced by said pump; and control means operated by said torque responsive means in said actuated condition to actuate said regulating operating means to adjust said pump to reduce the volume displaced by said pump whereby the torque transmitted from the drive motor to said pump is reduced from maintaining a constant output of said pump, said torque responsive means including first and second coupling parts connected with said output means and input means, respectively, for rotation, torque responsive connecting means in said first and second coupling parts permitting relative angular movement between said first and second coupling parts to said actuated condition when said predetermined torque is exceeded, and transmitting means for transmitting to said control means a signal representing said actuated condition.

7. Torque responsive regulating apparatus comprising a pump having input means including an input shaft; a drive motor having output means including an output shaft; torque responsive means forming a driving connection between output means and said input means, said torque responsive means having a normal condition and an actuated condition, and moving to said actuated condition when the torque transmitted from said motor to said pump exceedes a predetermined maximum torque; regulating operating means for varying the volume displaced by said pump; and control means operated by said torque responsive means in said actuated condition to actuate said regulating operating means to adjust said pump to reduce the volume displaced by said pump whereby the torque transmitted from said drive motor to said pump is reduced for maintaining a constant output of said pump, said torque responsive means including first and second coupling parts one of which is connected with said output shaft and the other is connected with said input shaft for rotation, said first coupling part being mounted on the respective shaft for axial movement, biasing means for biasing said first coupling part in axial direction towards said second coupling part, said coupling parts having confronting slanted face portions causing axial displacement of said first coupling part when said first coupling part is angularly displaced relative to said second coupling part to said actuated condition when said predetermined torque is exceeded, and sensing means responsive to the axial displacement of said first coupling part and connected with said control means for actuating the same when said predetermined torque is exceeded.

8. Torque responsive regulating apparatus comprising a pump having an input means, a high-pressure fluid outlet, and a low-pressure fluid reservoir; a drive motor having an output means; torque responsive means forming a driving connection between said output means and said input means, said torque responsive means having a normal condition and an actuated condition, and moving to said actuated condition when the torque transmitted from said motor to said pump exceeds a predetermined maximum torque; regulating opeating means for varying the volume displaced by the pump and including a hydraulic operating motor having an operating piston and an operating cylinder; control means operated by said torque responsive means in said actuated condition to actuate said regulating operating means to adjust said pump to reduce the volume displaced by said pump whereby the torque transmitted from said drive motor to said pump is reduced for maintaining a constant output of said pump, said control means including a control valve having a valve cylinder and a control valve slide, said control valve slide being operated by said torque responsive means to control the flow of fluid in said hydraulic operating motor; and a hydraulic circuit including conduits for connecting said pressure fluid outlet and said reservoir with said operating cylinder of said hydraulic motor, and with said valve cylinder of said control valve.

* * * * *